US006223055B1

(12) United States Patent
Cyr

(10) Patent No.: US 6,223,055 B1
(45) Date of Patent: *Apr. 24, 2001

(54) WIRELESS OFFICE ARCHITECTURE AND METHOD OF OPERATION THEREOF

(75) Inventor: Bernard Louis Cyr, Aurora, IL (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,281

(22) Filed: Oct. 24, 1997

(51) Int. Cl.[7] .................................................. H04B 1/38
(52) U.S. Cl. .......................... 455/555; 455/554; 455/445
(58) Field of Search ..................................... 455/554, 555, 455/556, 445, 422, 426, 463, 31.1, 31.2, 31.3, 428, 446

(56) References Cited

U.S. PATENT DOCUMENTS

| | | | |
|---|---|---|---|
| 4,775,997 | * 10/1988 | West, Jr. et al. | 455/554 |
| 5,265,150 | * 11/1993 | Helmkamp et al. | 455/555 |
| 5,379,339 | * 1/1995 | Sakamoto | 455/555 |
| 5,390,233 | * 8/1993 | Jensen et al. | 455/555 |
| 5,454,032 | * 9/1995 | Pinard et al. | 455/445 |
| 5,544,226 | * 8/1996 | Weis et al. | 455/555 |
| 5,757,902 | * 5/1998 | Mitsuo | 455/555 |
| 5,758,281 | * 5/1998 | Emery et al. | 455/428 |
| 5,799,250 | * 8/1998 | Veloso et al. | 455/554 |
| 5,841,854 | * 11/1998 | Schumacher et al. | 455/554 |
| 5,870,673 | * 2/1999 | Haartsen | 455/554 |
| 5,890,055 | * 3/1999 | Chu et al. | 455/446 |

* cited by examiner

Primary Examiner—Nay Maung
Assistant Examiner—Quochien Vuong

(57) ABSTRACT

A wireless office architecture, and method of operation thereof, including: (1) a private branch exchange (PBX) having a wired extension and (2) a wireless base station, couplable to the PBX and having a wireless terminal, the wireless terminal associated with the wired extension to allow the wireless base station and the PBX to cooperate to manage the wireless terminal and the wired extension as a unified extension, the wireless base station and the wireless terminal communicating according to a public network standard protocol to allow the wireless terminal to interact both with the wireless base station and in the public network.

21 Claims, 2 Drawing Sheets

WIRELESS OFFICE ARCHITECTURE AND METHOD OF OPERATION THEREOF

TECHNICAL FIELD OF THE INVENTION

The present invention is directed, in general, to wireless telecommunications and, more specifically, to a standards-based wireless office architecture that provides both a wireless extension to a private branch exchange (PBX) system and a seamless interface to a public wireless network.

BACKGROUND OF THE INVENTION

Public wireless service providers are now facing the maturation of their traditional public service markets as well as increased competition due to the additional market entrants in the Personal Communications System ("PCS") frequency bands. To counter these growth-diminishing trends, wireless service providers are now looking to grow their businesses by extending their coverage into buildings, to extend and enhance their public system coverage and to provide premium private system services to business and institutional customers.

Current market estimates indicate as much as 35% of the future market for radio base stations may be related to in-building services. The types of premium services being considered include rate discounts based on location for business and high density public service areas, and wireless business services which provide wireless extensions to wired office systems for workers who need to be both mobile and accessible. Wireless service providers are motivated to extend their coverage into buildings to better serve their public users and to grow the potential market of private users.

Expansion of the public system coverage area with improved call quality and reliability can result in increased system usage and revenues. Areas that may be targeted for extended public system coverage include airports, subways, shopping malls, convention centers, sports and entertainment complexes, government facilities and other public institutions. Ideally, the service provided in these public in-building areas should be identical to and transparent with a subscriber's public system service (with the exception that rate discounts based on location may be offered to some subscribers).

Accordingly, what is needed in the art is a wireless office architecture, and method of operation thereof, that extends the services of a private wired PBX to a wireless terminal that operates both onsite and anywhere in a service providers' public coverage area.

SUMMARY OF THE INVENTION

To address the above-discussed deficiencies of the prior art, the present invention provides, in one embodiment, a wireless office architecture that includes: (1) a private branch exchange ("PBX") having a wired extension and (2) a wireless base station, couplable to the PBX and having a wireless terminal, the wireless terminal associated with the wired extension to allow the wireless base station and the PBX to cooperate to manage the wireless terminal and the wired extension as a unified extension, the wireless base station and the wireless terminal communicating according to a public network standard protocol to allow the wireless terminal to interact both with the wireless base station and in the public network.

Thus, the present invention introduces the broad concept of a wireless office architecture that extends the services of a private wired PBX to a wireless terminal that operates both onsite and anywhere in a service providers' public network.

As used herein, "wireless base station" includes both the singular and plural; i.e., a "wireless base station" may be a single radio communications device or may be, for example, a plurality of distributed radio communications devices that cooperate to provide wireless communications services over a broad physical area.

In one embodiment of the present invention, the wireless base station routes calls from the wireless terminal to another wired extension of the PBX based only on a dialed extension number; i.e., the wireless terminal may access all the conventional features of wired extensions of a PBX.

In one embodiment of the present invention, the wireless base station is a wireless station in the public network.

In one embodiment of the present invention, the wireless base station is located proximate the PBX. Alternatively, the wireless base station, or stations, may be distributed throughout a facility at great distances from the PBX.

In one embodiment of the present invention, the wireless base station routes calls received from a wireless terminal dissociated from the PBX; i.e., a wireless base station may route calls from a wireless terminal regardless of whether the terminal is associated with a wired extension of the PBX. For example, the wireless base station may be associated with a public wireless network and allow for users of the public wireless network to place and receive calls while within the facility having the wireless base station.

In one embodiment of the present invention, the wireless terminal is selected from the group consisting of: (1) a wireless telephone, (2) a pager, and (3) a wireless facsimile machine. In a related embodiment of the present invention, the wireless base station is coupled to a local area network ("LAN"), the wireless terminal being a computer.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
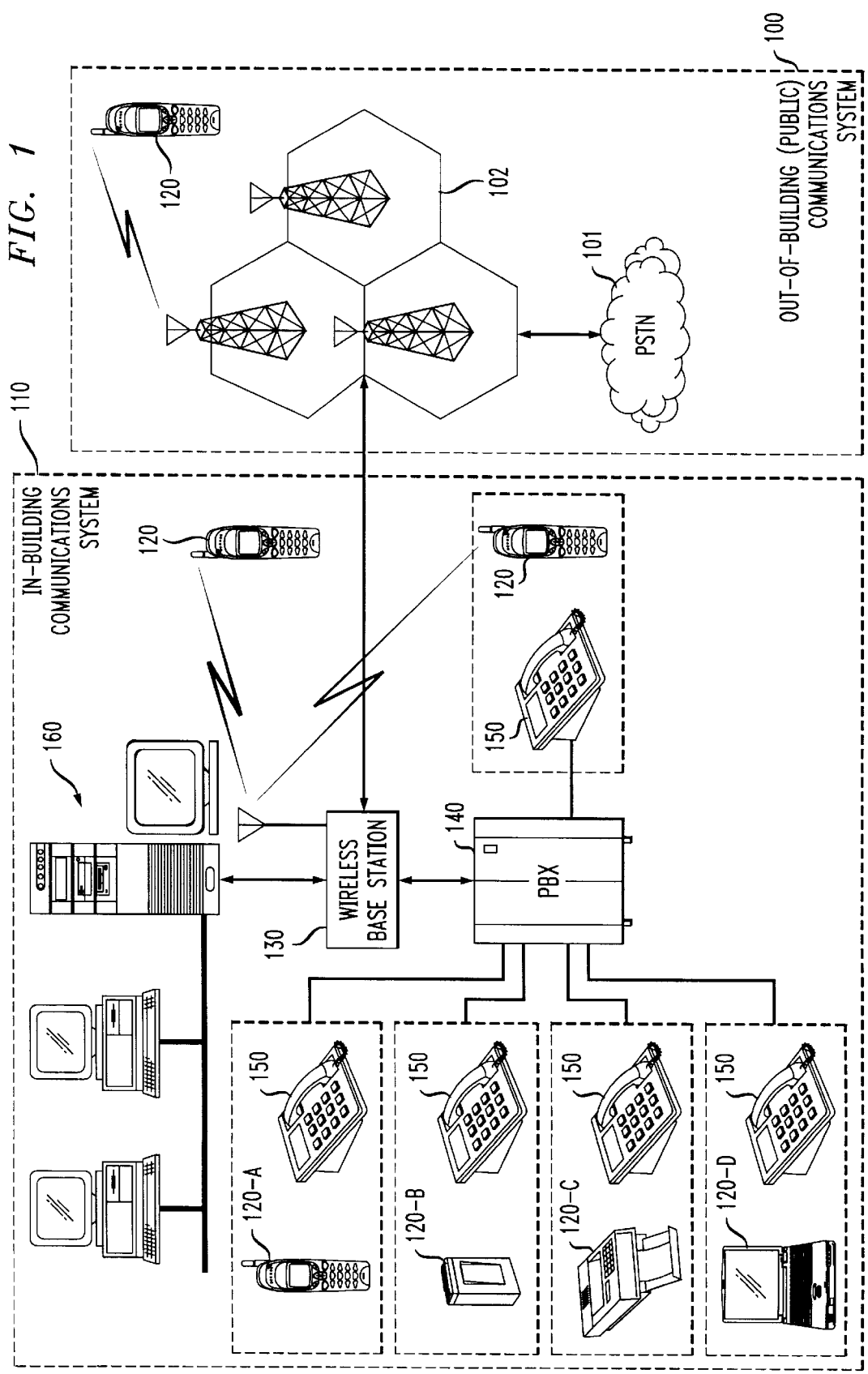
FIG. 1 illustrates an exemplary wireless office architecture employing the principles of the present invention.

Before describing in detail the features and advantages of the invention, a general architecture for employing the principles of the invention will first be described. Referring initially to FIG. 1, illustrated is an exemplary wireless office architecture employing the principles of the present invention. The architecture includes an out-of-building, or "public," communications system 100 and an in-building communications system 110 which supports both "private" and "public" users. The public communications system 100 includes a conventional public-switched telephone network ("PSTN") 101 and a conventional wireless (e.g., cellular) network 102 for communicating with wireless terminals, generally designated 120. A wireless terminal 120, which may be, for example, a telephone or pager device, can communicate with other wireless terminals via the conventional wireless network 102 using a standard protocol, such as time-division multiple access ("TDMA"). According to the principles of the present invention, the wireless terminal 120 is capable of communicating with a wireless base station 130 in the in-building communications system 110 using the same standard protocol. In one embodiment, the wireless base station 130 is coupled to and forms a part of the wireless network 102, whereby in-building wireless communications are seamlessly integrated with wireless communications in the public communications system 100.

In addition to the wireless base station 130, the in-building communications system 110 includes a private branch exchange ("PBX") 140 that is couplable to the wireless base station 130, and a plurality of wired extensions, generally designated 150, coupled to the PBX 140. The PBX 140 is also coupled to the PSTN 101 whereby communications may be routed between the in-building communications system 110 and the public communications system 100; e.g., voice calls can be routed between a wireless terminal 120 and a wired extension 150 via the public wireless network 102, PSTN 101 and PBX 140.

Figure 2:
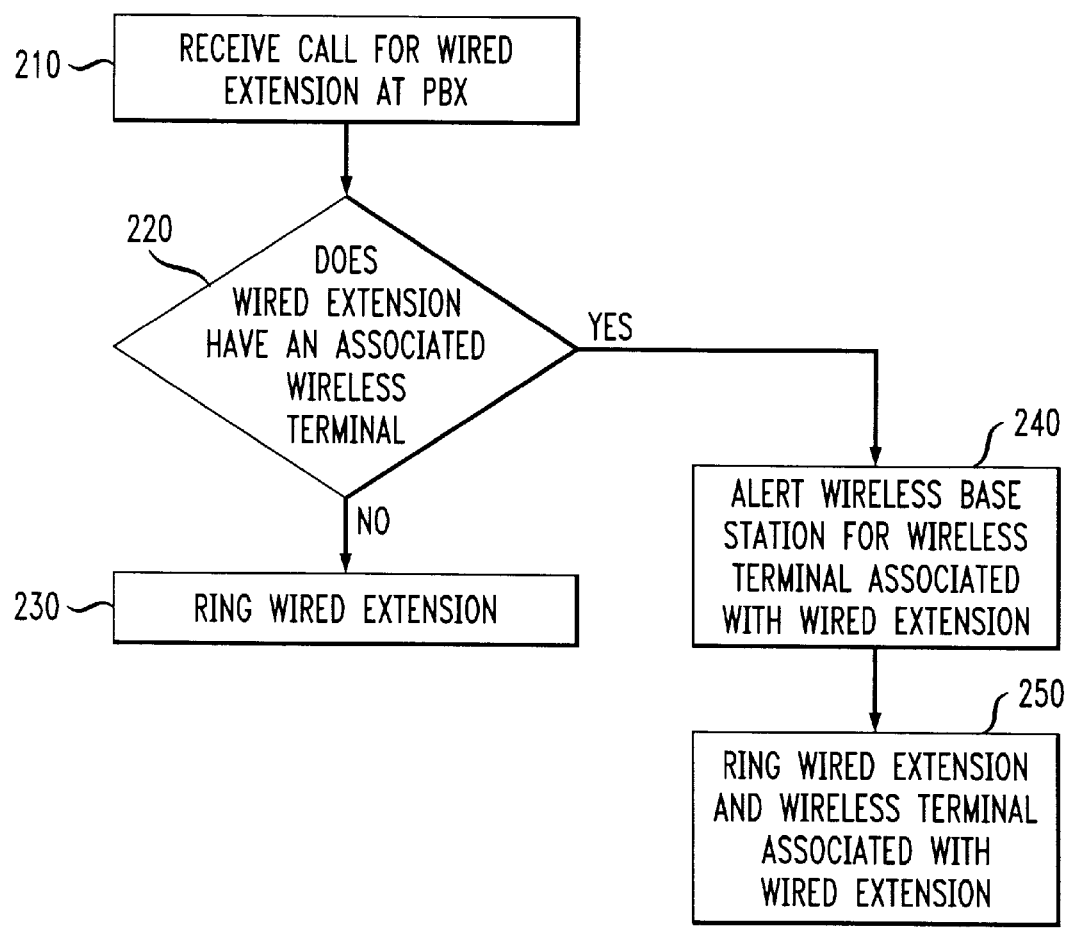
FIG. 2 illustrates a flow chart for an exemplary method of routing a call through the exemplary wireless office architecture illustrated in FIG. 1.

Each of the wired extensions 150 may have one or more wireless terminals "associated" therewith, such as a wireless telephone 120A, a pager 120-B, a wireless facsimile machine 120-C, or a computer 120-D; as used herein, "associated" is defined to mean that a wired extension 150 and a wireless terminal 120 are managed as a unified extension. Referring to FIG. 2, illustrated is a flow chart for an exemplary method of routing a call through the exemplary wireless office architecture illustrated in FIG. 1; the method of routing a call is operative to manage a wired extension 150 and a wireless terminal 150 associated therewith as a unified extension.

The first step 210 in the method of routing a call to a given extension number is the receipt of a call for a wired extension 150 at the PBX 140; the origin of the call may be from another wired extension 150 or a wireless terminal 120 within the in-building communications system 110, or the call may originate external to the in-building communications system 110 (i.e., the public communications system 100) and be routed to the PBX 140, for example, through the PSTN 101. In a second step 220, the PBX 140 determines whether the wired extension 150 corresponding to the given extension number has an associated wireless terminal 120. If the wired extension 150 does not have an associated wireless terminal 120, then the PBX 140 only rings the wired extension 150 in a step 230. If the wired extension 150 does have an associated wireless terminal 120, however, the PBX 140 alerts the wireless base station 130 in a step 240; in a step 250, the PBX 140 and the wireless base station 130 cooperate to simultaneously ring both the wired extension 150 and the associated wireless terminal 120, respectively.

As noted previously, the wireless base station 130 may be a wireless station in the public communications network 100; i.e., the wireless base station 130 may form a portion of the wireless network 102. Thus, in steps 240 and 250, the PBX 140 and wireless base station 130, via the wireless network 102, may cooperate to ring a wireless terminal 120 even when the terminal is "outside" the in-building communications system 110. In this manner, a call may be delivered to a wireless terminal 120 regardless of its location, the PBX 140 cooperating with the wireless network 102 to locate and page a wireless terminal 120 anywhere within both the in-building communications system 110 and the public communications network 100.

The cooperation between the PBX 140 and the public communications network 102 in receiving and delivering calls to a wireless terminal 120 has the advantage that features of the in-building communications system 110 can be accessed by a wireless terminal 120 when that terminal is outside the in-building system. For example, a wireless terminal 120 may use the on-premise dialing plan of the in-building system, receive voice-mail notification from an on-premise voice message system, and have the same directory number, even when the terminal is outside the in-building communications system 110.

In one embodiment, the wireless base station 130 may further be coupled to a local area network ("LAN") 160, whereby a wireless terminal 120 can communicate directly through the wireless base station 130 with the computing resources of the LAN 160. In particular, a computer 120-D associated with a wired extension may communicate directly through the wireless base station 130 with the LAN 160. Thus, the wireless base station 130 may serve the dual purposes of 1) managing wired extensions 150 and wireless terminals 120 as unified extensions, and 2) providing wireless computer networking. Those skilled in the art will conceive of other advantageous uses of the wireless office architecture disclosed herein; such other advantageous uses are within the broad scope of the claims recited hereinafter.

The wireless office architecture disclosed herein is advantageously adapted to extend wired services of the PBX 140 to wireless terminals 120 that can operate both on the site of the in-building communications system 100 and anywhere in the coverage area of a wireless service providers' public communications system 100. The primary service characteristics of the wireless office architecture are: (1) feature integration with a wired premise system (e.g., the services provided by PBX 140 and wired extensions 150) and (2) extension of features of the in-building communications system 110 into the wireless network 102 of the public communications system 100.

With respect to both primary service characteristics of the wireless office architecture disclosed herein, a wireless terminal 120 may be treated as an extension of an associated wired desk phone; i.e., a wired and a wireless terminal can share the same directory number and calling features, including: extension dialing, caller ID display, custom calling features, dial access to private voice and data networks and a common voice mailbox with message waiting indication and abbreviated access to voice mail. Simultaneous alerting of a wired extension 150 and its associated wireless terminal 120 is preferable to minimize call setup delays and, thereby, reduce the incidence of premature call abandonment by a calling party.

With respect to the second characteristic (i.e., extension of system features of the in-building communications system 110 into the wireless network 102 of the public communications system 100), to the extent possible, features that are available to subscribers to the in-building communications system 110 while they are onsite are also available to those subscribers when they are offsite anywhere in the wireless network 102 of the public communications system 100. For example: calls to a subscriber's PBX extension may be delivered to the subscriber anywhere in the public wireless network 102 (i.e., the wired and wireless terminals share a common directory number); the extension dialing available to the subscriber while onsite is also available to the subscriber anywhere in the public wireless network 102; and a message waiting indicator can be delivered to a subscriber anywhere in the public wireless network 102.

In addition, the wireless office architecture may provide some features that are unique to wireless access, such as authentication, voice privacy and message encryption. These features prevent fraudulent access and eavesdropping and are especially important to business and government users. Another example includes short message service, including alphanumeric paging with one button callback and wireless circuit data and facsimile.

Because of the availability of cordless adjuncts for PBX 140 that provide mobility onsite and that operate in un-licensed spectrum (i.e., use of the spectrum is free), potential customers for the wireless business services offered by the wireless office architecture disclosed herein are not expected to have much willingness to pay for onsite air-time, which is the primary revenue source in traditional public wireless markets. Thus, onsite air-time is not a motivation to provide wireless business services. Wireless service providers do expect, however, that once employees become accustomed to using wireless business services onsite, they will increasing choose to use those same services while offsite and in the public wireless network 102 where air-time and other feature charges can apply. Therefore, a public service providers' primary motivation for providing wireless business services is to increase subscribers and usage on the public wireless network 102.

Businesses that take advantage of the services provided by the wireless office architecture can benefit from the improved productivity of employees who are both mobile and accessible; individuals that use such wireless business services benefit from the flexibility and convenience that the services provide them. For service providers, there are also many benefits and economies associated with business accounts: business accounts are very economical to acquire and maintain; focused sales and marketing; batch provisioning; batch billing and timely collection; low turnover rates; business users are more likely to be heavy users; and business users are more likely to use premium services.

Another important marketing aspect of wireless business services is the potential they create for the service provider to pull through personal subscriptions. Once a business account is acquired, the service provider can then market a personal service to each user. The personal service is provided on the same handset as the business service. The subscriber is billed directly for personal calls and services while all business use is typically billed directly to the employer. To separate the billing for personal and business use, the subscriber is assigned a separate directory number for personal calls. For incoming calls the subscriber receives a distinctive alert and display to distinguish business from personal calls. When originating a call, the subscriber has the option to indicate whether the call is business or personal. This personal service is very attractive to employees since their employer pays for the handset and any fixed monthly fees and the individual pays only for air-time; personal calls can be delivered to a subscriber in both the public 102 and inbuilding 130 wireless systems.

A private, in-building, wireless system will preferably provide services to both public and private users that are transparent with the services provided to those users when they are served by the public wireless network 102. An obvious consequence of this is that the in-building system must support standard public system air interfaces and standard terminals; an in-building system that required wireless terminals with a separate radio mode for in-building use would be very expensive to deploy and difficult to integrate with the macro system. Thus, in a preferred embodiment, the wireless terminals 120 communicate with both the wireless base station 130 and the public wireless network 102 using a standard protocol, such as time-division multiple access ("TDMA"). The principles of the present invention, however, are not limited to a specific radio communications protocol.

As noted above, the intent of wireless service providers in extending the coverage of public wireless networks into buildings is to increase usage by increasing coverage area with improved in-building call quality and reliability. While increased in-building usage is not the primary goal of extending coverage into buildings for private wireless service users (since the willingness of such users to pay for air-time is not significant), it is certainly a consequence of deploying wireless office systems. Thus, both public and private wireless system usage requires systems that deliver significantly more capacity than conventional systems. The only way to increase capacity in cellular radio systems with a fixed number of channels is to decrease RF power output (and thereby shrink the channel reuse grid) and increase the number of wireless base stations 130. Thus, the wireless office architecture disclosed herein preferably employs wireless base stations 130 that are lower power, smaller and much less expensive than the wireless base stations that are deployed in conventional outdoor wireless networks to cover much larger areas.

The use of very-low-power wireless base stations enables the deployment of an in-building system that uses public spectrum but does not "steal" too much capacity from the surrounding outdoor public wireless network 102; this is essential, especially for wireless business systems where the revenue from spectrum use is not expected to be significant.

There are two possible configurations of wireless base stations 130 that can be employed to provide good in-building coverage while meeting the low power and cost requirements described above; "distributed-antenna" and "distributed-radio."

A distributed-antenna base station configuration has a centralized pool of radios connected to an RF distribution medium, such as fiber or leaky coax, that carries the RF signal to antennas that are distributed throughout a building. One disadvantage of this architecture, however, is that it can be very expensive to install the RF distribution media, so the startup costs are high, and the investment in the distribution media is not easily recoverable should the customer choose to discontinue the service or change service providers. There is currently some development effort, however, directed to distributed-antenna systems that can distribute RF over twisted pairs; this is a promising development considering the economies of the centralized radio/distributed-antenna configuration.

A distributed-radio base station configuration preferably employs very small base stations in terms of physical size, coverage area and number of channels; conventional radios suitable for this configuration are typically about ⅓ cubic foot in size with a coverage radius of 25 meters and 4 to 8 traffic channels. This type of wireless base station is often referred to as a "pico-cell." A distributed-radio base station should be located very near wireless terminal users. The primary advantage of distributing radios throughout a building to provide low power coverage is that the signal (whether packetized or PCM encoded) between the radio and switch (or base station controller) can be carried on twisted pair wiring which is inexpensive and readily available in most buildings. The disadvantage of the distributed-radio configuration is that more radios are required to cover a given physical area because each radio base station has such a small coverage area. That is, the distributed-radio configuration is not as efficient as a centralized radio configuration at taking advantage of the natural traffic variations over a larger area, and requires more radios overall to compensate for this inefficiency.

Another critical characteristic of in-building wireless base stations 130 and wireless business systems pertains to ease of RF engineering. Developing RF frequency plans to avoid interference and optimize performance is a significant ongoing engineering expense for wireless service providers. The channels installed in buildings cover much smaller areas and generate less revenue than high powered channels in outdoor public wireless networks. Therefore, in-building wireless base stations and systems are preferably much less expensive per channel to install and maintain.

For ease of installation and maintenance, the ideal in-building wireless system should support: (1) automatic radio frequency assignment for both traffic and control channels, (2) automatic real-time detection of interference and automatic interference avoidance by handoff to a clear frequency, (3) automatic identification of neighboring base stations and (4) automatic generation of the data required to support handoffs between neighboring base stations.

As noted previously, the wireless base stations 130 and the public wireless network 102 preferably use a common standard protocol. Both ANSI digital air-interface standards, IS-136 TDMA and IS-95 CDMA, support a full array of system and subscriber features that are required for in-building and wireless business services, including: (1) support for both public and private traffic on the same base station with the option to disallow public traffic where desired; (2) location area display (informs the user with a visual display when they are registered on a private system); (3) authentication and privacy; (4) short message services; (5) calling party identification; (6) voice mail notification; and (7) data and facsimile.

The IS-136 TDMA standard has unique characteristics that make it well suited to provide in-building and private system services. TDMA is a narrow-band technology (the carriers are 30 kHz with 3 channels per carrier) so it is well suited to both the distributed-radio and distributed-antenna base station configurations. In addition, the IS-136 TDMA standard also supports "hierarchical cells;" that is, TDMA supports configurations where cells having smaller, lower-powered base stations (e.g., wireless base station 130) are located within larger cells having higher-powered base stations (e.g., public wireless network 102). The use of hierarchical cells enables micro and smaller distributed-radio base stations that support in-building coverage areas to be located within areas also covered by higher-powered macro base stations. The macro base stations can broadcast pointers to the control channels of underlain micro and pico base stations so that wireless terminals can select the micro and pico base stations even though they are broadcasting at much lower power.

The IS-136 TDMA standard also supports Private System Identifiers ("PSID"s). Each IS-136 control channel can broadcast up to 16 PSIDs as well as a public system identifier. The PSIDs that a base station broadcasts identify the private systems for which the base station provides services. A wireless terminal 120 can read the PSIDs that are broadcast by a base station and register for private system services when they detect a PSID for which they are authorized for private services.

The IS-95 CDMA standard is a wide-band technology with a carrier width of 1.25 MHZ that supports approximately 25 users. Therefore, CDMA is well suited for the distributed-antenna base station configuration, but not the distributed-radio configuration. The IS-95 CDMA standard supports the broadcast of a Network Identifier ("NID"), in addition to a PSID, which identifies the private system that the base station supports. As with TDMA, a wireless terminal 120 can read the NID and register for private system services when it detects a NID for which it is authorized for private services. Conventional in-building systems that support only public users are typically served by base stations that are hosted by a surrounding macro Mobile Switching Center ("MSC"). The in-building base stations are connected to the MSC with the same type of T1 interface as macro base stations, and provide the same services as the macro base stations. The in-building wireless office architecture disclosed herein for providing wireless business services has the additional requirement of feature integration with an onsite PBX 140. Also, unlike public in-building systems, wireless office systems have a large local community of calling interest (that is, a much higher percentage of calls remain onsite) and, therefore, onsite switching is desirable to minimize transmission facilities costs. In addition, since it is often desirable to serve public users in areas that also serve wireless office users, the wireless office architecture also preferably supports direct traffic facilities to the PSTN 101, since public traffic cannot be routed through a PBX.

A final network consideration is the location of subscriber feature data. In public systems, subscriber feature data is typically located in a network element called a Home Location Register ("HLR"). The HLR is a Service Control Point ("SCP") that is networked to all MSCs that may provide service to its subscribers. The HLR provides the serving MSCs with a subscriber's feature profile and other instructions about how the subscriber is to be served.

Given the above switching and network requirements for wireless business systems, there are two approaches to implementation: 1)an onsite MSC, or 2) a virtual private system hosted by a macro MSC. In either approach, integration with the PBX 140 can be achieved through ISDN-PRI connections between the PBX 140 and the MSC; the MSC controls and provides features to the wireless calls.

An onsite MSC can be networked to the larger wireless network using the ANSI-41 Mobile Application Part ("MAP") protocol carried on SS7 links. The onsite MSC fulfills the roles of a MSC and a Visitor Location Register ("VLR") as defined in the ANSI-41 network reference model. An onsite MSC can also support direct ISDN User Part ("ISUP") traffic connections to the PSTN 101 in cases where support for public users is required. This approach satisfies the requirement for onsite switching; it has the disadvantage, however, that current MSC implementations are too expensive to be economical for all but the largest of wireless office systems.

The virtual private systems approach is more economical in terms of network equipment costs because the MSC infrastructure costs are shared with the macro system and any other private systems hosted by the macro system. The disadvantage of this approach is higher ongoing facilities costs since all wireless traffic is back-hauled to the macro MSC. A variation to this approach addresses the facilities costs by locating a remote-switching module onsite; all local traffic is switched onsite with control provided by the host MSC.

In either approach, the subscriber data is maintained in a network HLR since that data must be available to all MSCs that may serve the wireless business service subscribers. The HLR supports interfaces to an onsite voice mail system through which it receives voice message-waiting status for delivery to the wireless terminals 120. Organizations with PBXs are accustomed to control of their system and subscribers, so some limited access to the HLR by the wireless business service customer to configure subscriber authorization and feature set, for example, is very desirable. Such access can be provided via secured dialup or LAN connections to the service provider's HLR or, to a Service Management System that provides a front-end interface to the HLR.

The foregoing has described preferred and alternative embodiments of a wireless office architecture and the features and advantages thereof. Although the present invention has been described in detail, those skilled in the art should understand that they can make various changes, substitutions and alterations herein without departing from the spirit and scope of the invention in its broadest form.

What is claimed is:

1. A wireless office architecture, comprising:
   a private branch exchange (PBX) having a wired extension; and
   a wireless base station, couplable to said PBX and having a wireless terminal, said wireless terminal associated with said wired extension to allow said wireless base station and said PBX to cooperate to manage said wireless terminal and said wired extension as a unified extension, said wireless base station and said wireless terminal communicating according to a public network standard protocol to allow said wireless terminal to interact both with said wireless base station in an on-premise dialing plan and in said public network, said wireless terminal having access to at least one feature of said PBX as said wireless terminal communicates via said public network, said on-premise dialing plan allowing said wireless terminal to call extensions of said PBX using an extension number and receiving calls via a directory number even when said wireless terminal is outside a building housing said PBX.

2. The architecture as recited in claim 1 wherein said wireless base station is a wireless station in said public network and said wired extension and said wireless terminal share said at least one feature.

3. The architecture as recited in claim 1 wherein said wireless base station routes calls from said wireless terminal to another wired extension of said PBX based only on a dialed extension number.

4. The architecture as recited in claim 1 wherein said wireless base station is located proximate said PBX.

5. The architecture as recited in claim 1 wherein said wireless base station routes calls received from a wireless terminal dissociated from said PBX.

6. The architecture as recited in claim 1 wherein said wireless terminal is selected from the group consisting of:
   a wireless telephone,
   a pager, and
   a wireless facsimile machine.

7. The architecture as recited in claim 1 wherein said wireless base station is coupled to a local area network (LAN) said wireless terminal being a computer.

8. A method of routing a call to a given extension number of a private branch exchange (PBX) through a wireless office architecture, comprising the steps of:
   routing said call to said PBX, said PBX having a wired extension having said given extension number;
   alerting a wireless base station, couplable to said PBX and having a wireless terminal, said wireless terminal also having said given extension number to allow said wireless base station and said PBX to cooperate to manage said wireless terminal and said wired extension as a unified extension having said given extension number; and
   ringing both said wired extension and said wireless terminal, said wireless base station and said wireless terminal communicating according to a public network standard protocol to allow said wireless terminal to interact both with said wireless base station in an on-premise dialing plan and in said public network, said wireless terminal having access to at least one feature of said PBX as said wireless terminal communicates via said public network, said on-premise dialing plan allowing said wireless terminal to call extensions of said PBX using an extension number and receiving calls via a directory number even when said wireless terminal is outside a building housing said PBX.

9. The method as recited in claim 8 wherein said wireless base station is a wireless station in said public network and said wired extension and said wireless terminal share said at least one feature.

10. The method as recited in claim 8 further comprising the step of routing calls from said wireless terminal to another wired extension of said PBX based only on a dialed extension number.

11. The method as recited in claim 8 wherein said wireless base station is located proximate said PBX.

12. The method as recited in claim 8 further comprising the step of routing calls received from a wireless terminal dissociated from said PBX.

13. The method as recited in claim 8 wherein said wireless terminal is selected from the group consisting of:
   a wireless telephone,
   a pager, and
   a wireless facsimile machine.

14. The method as recited in claim 8 wherein said wireless base station is coupled to a local area network (LAN), said wireless terminal being a computer.

15. A wireless office architecture, comprising:
   a private branch exchange (PBX);
   a plurality of wired extensions coupled to said PBX;
   a wireless base station, coupled to said PBX; and
   a plurality of wireless terminals couplable to said wireless base station and corresponding to said plurality of wired extensions to allow said wireless base station and said PBX to cooperate to manage said pluralities of wireless terminals and wired extensions in tandem, said wireless base station and said wireless terminal communicating according to a public network standard protocol to allow said plurality of wireless terminals to interact both with said wireless base station in an on-premise dialing plan and in said public network, said wireless terminal having access to at least one feature of said PBX as said wireless terminal communicates via said public network, said on-premise dialing plan allowing said wireless terminal to call extensions of said PBX using an extension number and receiving calls via a directory number even when said wireless terminal is outside a building housing said PBX.

16. The architecture as recited in claim 15 wherein said wireless base station is a wireless station in said public network and said wired extension and said wireless terminal share said at least one feature.

17. The architecture as recited in claim 15 wherein said wireless base station routes calls from said wireless terminal to another wired extension of said PBX based only on a dialed extension number.

18. The architecture as recited in claim 15 wherein said wireless base station is located proximate said PBX.

19. The architecture as recited in claim 15 wherein said wireless base station routes calls received from a wireless terminal dissociated from said PBX.

20. The architecture as recited in claim 15 wherein said wireless terminal is selected from the group consisting of:

a wireless telephone, a pager, and a wireless facsimile machine.

21. The architecture as recited in claim 15 wherein said wireless base station is coupled to a local area network (LAN), said wireless terminal being a computer.

* * * * *